US012589659B2

(12) United States Patent
Kurokawa

(10) Patent No.: US 12,589,659 B2
(45) Date of Patent: Mar. 31, 2026

(54) VEHICLE CONTROL APPARATUS

(71) Applicant: Honda Motor Co., Ltd., Tokyo (JP)

(72) Inventor: Takuya Kurokawa, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 197 days.

(21) Appl. No.: 18/439,986

(22) Filed: Feb. 13, 2024

(65) Prior Publication Data

US 2024/0270083 A1 Aug. 15, 2024

(30) Foreign Application Priority Data

Feb. 15, 2023 (JP) ................................. 2023-021731

(51) Int. Cl.
B60L 15/20 (2006.01)
B60L 3/00 (2019.01)
B60W 10/08 (2006.01)
(52) U.S. Cl.
CPC ............. B60L 15/20 (2013.01); B60L 3/0023 (2013.01); B60W 10/08 (2013.01); *B60L 2240/12* (2013.01); *B60L 2240/423* (2013.01); *B60W 2520/28* (2013.01); *B60W 2710/081* (2013.01);
(Continued)
(58) Field of Classification Search
CPC ...... B60L 3/0023; B60L 3/0061; B60L 15/20; B60W 20/50; B60W 50/029; B60W 2050/0295
See application file for complete search history.

(56) References Cited

U.S. PATENT DOCUMENTS

| | | | |
|---|---|---|---|
| 2011/0137531 A1* | 6/2011 | Noguchi | B60K 23/0808 |
| | | | 701/54 |
| 2015/0145460 A1* | 5/2015 | Tajima | H02P 23/0031 |
| | | | 318/490 |
| 2020/0011413 A1* | 1/2020 | Saeki | B60W 50/029 |

(Continued)

FOREIGN PATENT DOCUMENTS

| | | | | |
|---|---|---|---|---|
| CN | 115031964 A | * | 9/2022 | G01M 13/025 |
| CN | 115593238 A | * | 1/2023 | B60L 15/20 |

(Continued)

OTHER PUBLICATIONS

EPO machine translation of Jp 2007-154934A (original JP document published Jun. 21, 2007) (Year: 2007).*

(Continued)

*Primary Examiner* — David A Testardi
(74) *Attorney, Agent, or Firm* — Duft & Bornsen, PC

(57) ABSTRACT

Vehicle control apparatus includes: first/second shaft coupled with first/second drive wheel of vehicle; differential gear mechanism configured to distribute torque from motor to first/second shaft; sensor configured to detect first/second wheel rotation speed and motor rotation speed; and motor control unit including processor and memory. Motor control unit: calculates input rotation speed into differential gear mechanism based on motor rotation speed; calculates output rotation speed from differential gear mechanism based on first/second wheel rotation speed; calculates difference between input rotation speed and output rotation speed; determines whether duration of state in which difference exceeds predetermined value has exceeded determination time; and limits motor target torque to zero when it is determined that duration has exceeded determination time.

6 Claims, 8 Drawing Sheets

(52) U.S. Cl.
     CPC . *B60W 2710/083* (2013.01); *B60W 2710/086*
     (2013.01)

(56) References Cited

U.S. PATENT DOCUMENTS

2023/0158890 A1 *   5/2023   Maeda ................ B60L 15/2036
                                                              701/22
2024/0001944 A1 *   1/2024   Hillbring ............. G01M 13/02

FOREIGN PATENT DOCUMENTS

| | | | | |
|---|---|---|---|---|
| JP | 2007154934 | A | * | 6/2007 |
| JP | 2010090721 | A | * | 4/2010 |
| JP | 2011149508 | A | | 8/2011 |
| JP | 2011178359 | A | * | 9/2011 |
| JP | 2012148735 | A | * | 8/2012 |
| JP | 2014147146 | A | * | 8/2014 |
| JP | 2018096426 | A | * | 6/2018 |
| JP | 2018098898 | A | * | 6/2018 |
| JP | 7463580 | B1 | * | 4/2024 ............. B60K 17/16 |

OTHER PUBLICATIONS

EPO machine translation of Jp 2010-090721A (original JP document published Apr. 22, 2010) (Year: 2010).*

* cited by examiner

VEHICLE CONTROL APPARATUS

CROSS-REFERENCE TO RELATED APPLICATION

This application is based upon and claims the benefit of priority from Japanese Patent Application No. 2023-021731 filed on Feb. 15, 2023, the content of which is incorporated herein by reference.

BACKGROUND OF THE INVENTION

Field of the Invention

This invention relates to a vehicle control apparatus configured to control an electric vehicle.

Description of the Related Art

A vehicle control device configured to detect a failure of a differential device has been conventionally known (for example, see JP 2011-149508 A). The device described in JP 2011-149508 A acquires a signal representing the rotation number of each wheel, calculates a fluctuation amount in the rotation number of a drive wheel from a rotation number difference between the drive wheel and a driven wheel, and determines whether the calculated fluctuation amount is larger than a specified value. In a case of determining that it exceeds the specified value, the device determines whether the time of data exceeding the specified value has period-icity, and in a case of determining that it has the periodicity, the device determines that the differential device fails.

However, in the configuration in which a failure deter-mination is made, based on the rotation number difference between the drive wheel and the driven wheel as in the device described in JP 2011-149508 A, it is not possible to satisfactorily determine whether the shaft connected with the differential gear mechanism is damaged or the like.

SUMMARY OF THE INVENTION

An aspect of the present invention is a vehicle control apparatus, including: a first shaft coupled with a first drive wheel of a pair of left and right drive wheels of a vehicle; a second shaft coupled with a second drive wheel of the pair of left and right drive wheels; a differential gear mechanism configured to distribute torque from a motor to the first shaft and the second shaft; a first wheel speed sensor configured to detect a first wheel rotation speed of the first drive wheel; a second wheel speed sensor configured to detect a second wheel rotation speed of the second drive wheel; a motor rotation speed sensor configured to detect a rotation speed of the motor; and a motor control unit including a processor and a memory coupled to the processor, and configured to control the motor. The motor control unit: calculates an input rotation speed input into the differential gear mechanism based on the rotation speed of the motor; calculates an output rotation speed output from the differential gear mechanism based on the first wheel rotation speed and the second wheel rotation speed; calculates a difference between the input rotation speed and the output rotation speed; determines whether a duration of a state in which the difference exceeds a predetermined value has exceeded a determination time; and limits a target torque of the motor to zero when it is determined that the duration has exceeded the determination time.

BRIEF DESCRIPTION OF THE DRAWINGS

The objects, features, and advantages of the present invention will become clearer from the following descrip-tion of embodiments in relation to the attached drawings, in which.

DETAILED DESCRIPTION OF THE INVENTION

Hereinafter, embodiments of the present invention will be described with reference to FIGS. 1 to 11. A vehicle control apparatus according to an embodiment of the present inven-tion is applied to an electric vehicle such as an electric automobile, a fuel cell automobile, a plug-in hybrid auto-mobile, or a hybrid automobile, and determines whether a drive shaft connected with a differential gear mechanism is damaged or the like. More specifically, the probability of a shaft damage is determined in a stepwise manner, and a fail-safe action (FSA) is conducted, as necessary.

Figure 1:
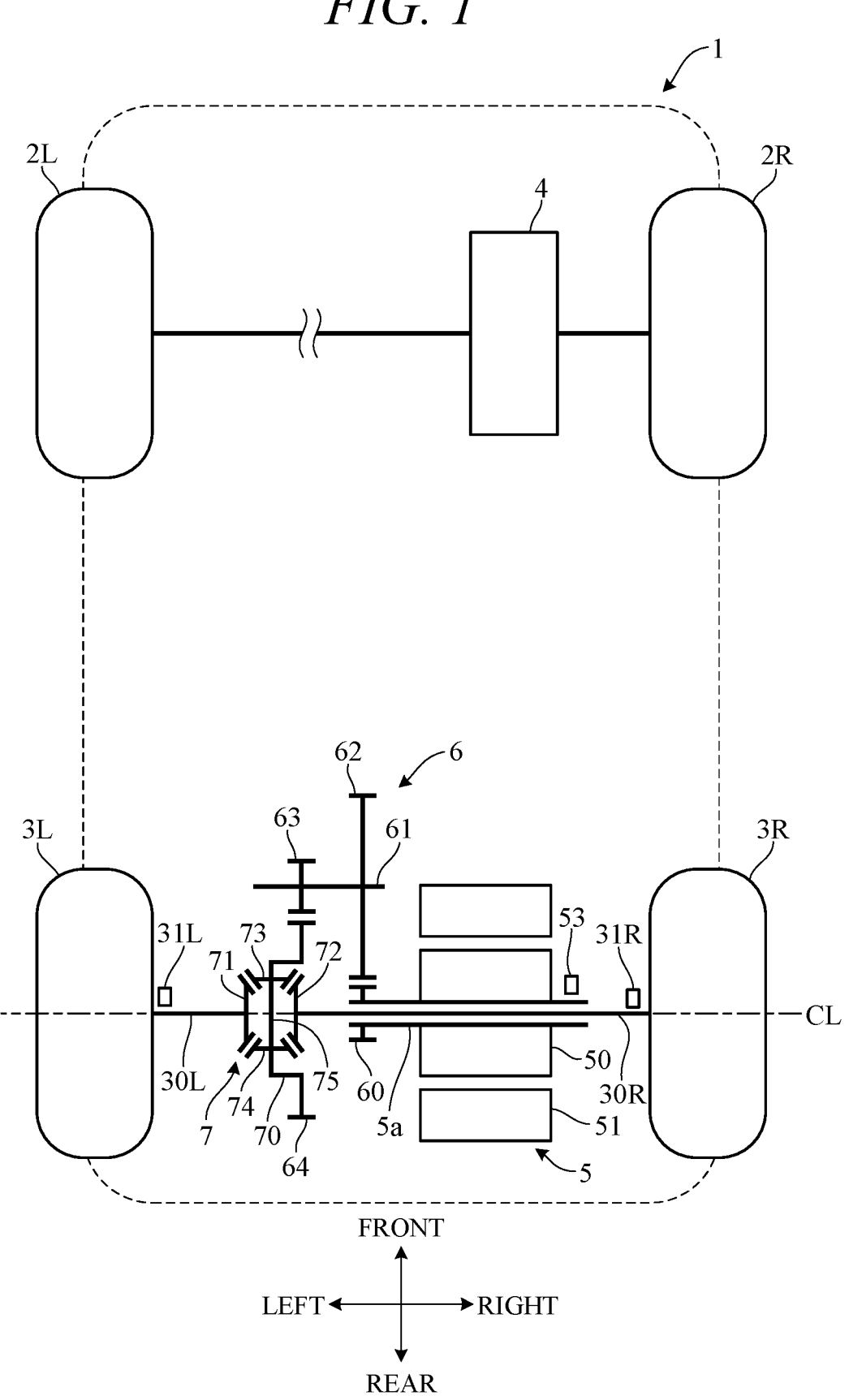
FIG. 1 is a skeleton diagram schematically illustrating an overall configuration of a drive system of a vehicle accord-ing to an embodiment of the present invention.

FIG. 1 is a skeleton diagram schematically illustrating an overall configuration of a drive system of a vehicle 1 according to the present embodiment. As illustrated in FIG. 1, the vehicle 1 is configured as an all wheeled drive (AWD) vehicle including: a pair of left and right front drive wheels 2L and 2R; a pair of left and right rear drive wheels 3L and 3R; a front motor 4, which drives the front drive wheels 2L and 2R; and a rear motor 5, which drives the rear drive wheels 3L and 3R. Since the front drive system and the rear drive system have similar configurations, the configuration of the rear drive system will be described mainly in the following.

Torque from the rear motor 5 is transmitted to the rear drive wheels 3L and 3R via a reduction gear mechanism 6, a differential gear mechanism 7, and a pair of left and right drive shafts (hereinafter, shafts) 30L and 30R respectively coupled with the pair of left and right rear drive wheels 3L and 3R. In the example of FIG. 1, the right shaft 30R penetrates the inside of a rotation shaft 5a of the rear motor 5. Similarly, the torque from the front motor 4 is also transmitted to the front drive wheels 2L and 2R though the reduction gear mechanism, the differential gear mechanism, and the drive shafts respectively connected with the pair of left and right front drive wheels 2L and 2R, and the vehicle 1 travels, accordingly.

Figure 2:
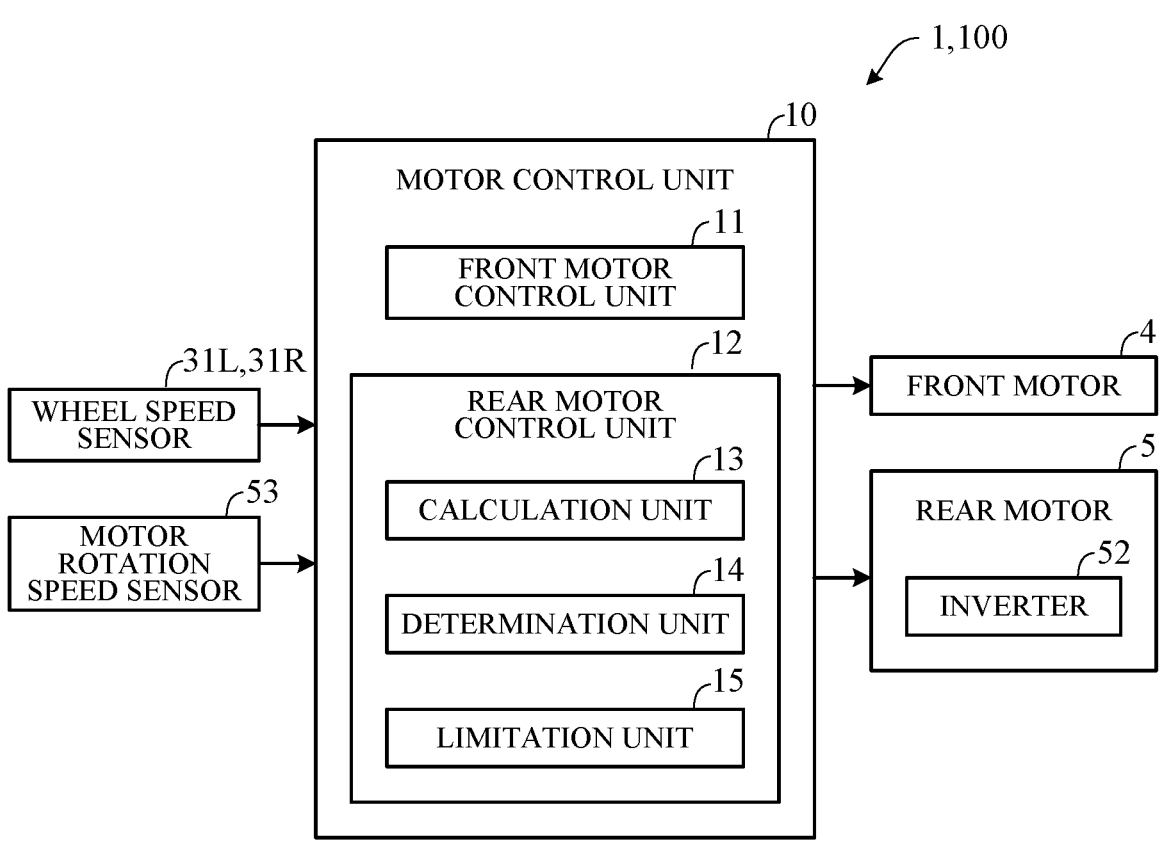
FIG. 2 is a block diagram schematically illustrating an example of main components of a vehicle control apparatus according to the embodiment of the present invention.

The rear motor 5 includes: a rotor 50 having a substantially cylindrical shape with an axis CL as the center; and a stator 51 having a substantially cylindrical shape and disposed around the rotor 50. The rear motor 5 is driven by electric power supplied from the battery, not illustrated, to a coil of the stator 51 via an inverter 52 (FIG. 2). The inverter 52 is controlled by a command from the motor control unit 10 (FIG. 2), and thus the rotation speed and the output torque of the rear motor 5 are controlled.

The reduction gear mechanism 6 includes: a drive gear 60 provided integrally with the rotation shaft 5a of the rear motor 5; an input-side driven gear 62 and an output-side driven gear 63 provided integrally with a driven shaft 61, which is provided in parallel with the rotation shaft 5a; and a ring gear 64 provided integrally with the differential gear mechanism 7. The input-side driven gear 62 meshes with the drive gear 60, and thus the torque from the rear motor 5 is transmitted (input) to the reduction gear mechanism 6. The output-side driven gear 63 meshes with the ring gear 64, and thus the torque from the rear motor 5 is transmitted (input) to the differential gear mechanism 7 via the reduction gear mechanism 6. The rotation of the rear motor 5 is decelerated at a reduction ratio $\alpha$ corresponding to the gear ratio of each of the gears 60, 62, 63, and 64 in the reduction gear mechanism 6, and is transmitted (input) to the differential gear mechanism 7.

The differential gear mechanism 7 includes: a pair of left and right side gears 71 and 72, each of which is disposed inside a differential case 70; and a pair of pinion gears 73 and 74, which mesh with each of the side gears 71 and 72. The pair of left and right side gears 71 and 72 are respectively coupled with tip end portions of the pair of left and right shafts 30L and 30R, which penetrate the differential case 70, and rotate integrally with the shafts 30L and 30R. The pair of pinion gears 73 and 74 are rotatably supported by a pinion shaft 75, which is fixed to the differential case 70, and which extends perpendicularly to the shafts 30L and 30R.

The torque that has been input into the differential gear mechanism 7 via the ring gear 64 is distributed to the left and right shafts 30L and 30R via the differential case 70, the pinion gears 73 and 74, and the side gears 71 and 72, and the vehicle 1 travels, accordingly. When the vehicle 1 travels straight, no rotation speed difference occurs between the left and right rear drive wheels 3L and 3R, and no rotation speed difference occurs between the side gears 71 and 72, which rotate integrally with the rear drive wheels 3L and 3R via the shafts 30L and 30R. Therefore, the pinion gears 73 and 74 do not rotate. When the vehicle 1 travels making a turn or when the rear drive wheels 3L and 3R slip (rotate idly), a rotation speed difference occurs between the left and right rear drive wheels 3L and 3R, a rotation speed difference also occurs between the side gears 71 and 72, and thus the pinion gears 73 and 74 rotate.

The AWD vehicle 1 is capable of traveling only with torque transmission from a main drive motor (for example, the front motor 4) to main drive wheels (for example, the front drive wheels 2L and 2R). For this reason, even though the torque transmission from an auxiliary drive motor (for example, the rear motor 5) to auxiliary drive wheels (for example, the rear drive wheels 3L and 3R) is shut off because of damage or the like of the drive shaft, the vehicle 1 is capable of continuously traveling.

However, in the differential gear mechanism 7, when the torque is input from the rear motor 5 in a state in which one of the drive shafts, for example, the shaft 30R is damaged, the rotation speeds of the side gear 72, in which the shaft is damaged, and the pinion gears 73 and 74 rapidly increase (rotate idly). In this case, not only the torque transmission to the rear drive wheels 3L and 3R is disabled, but also seizure may occur in the differential gear mechanism 7 (the gears 71 to 74). Therefore, in the present embodiment, the vehicle control apparatus is configured as follows so as to determine a probability of the shaft damage in a stepwise manner, conduct an appropriate fail-safe action as necessary, and prevent the seizure of the differential gear mechanism 7.

FIG. 2 is a block diagram schematically illustrating an example of main components of a vehicle control apparatus (hereinafter, an apparatus) 100 according to an embodiment of the present invention. As illustrated in FIG. 2, the apparatus 100 mainly includes a motor control unit 10, which is an electronic control unit (ECU) mounted on the vehicle 1. The motor control unit 10 includes a computer including a CPU (processor), a RAM and a ROM (memory), an I/O interface, and other peripheral circuits. The motor control unit 10 is connected with the front motor 4, the rear motor 5, wheel speed sensors 31L and 31R, which respectively detect wheel speeds WL and WR that are the rotation speeds of the rear drive wheels 3L and 3R, and a motor rotation speed sensor 53, which detects a rotation speed M of the rear motor 5.

The motor control unit 10 includes: a front motor control unit 11, which controls the front motor 4; and a rear motor control unit 12, which controls the rear motor 5. The rear motor control unit 12 includes: as functional configurations, a calculation unit 13; a determination unit 14; and a limitation unit 15. The rear motor control unit 12 functions as the calculation unit 13, the determination unit 14, and the limitation unit 15.

Torque Limitation

The calculation unit 13 calculates an input rotation speed Ri to be input into the differential gear mechanism 7, based on the rotation speed M of the rear motor 5 that has been detected by the motor rotation speed sensor 53. More specifically, the product of the rotation speed M of the rear motor 5 and the reduction ratio $\alpha$ of the reduction gear mechanism 6 is calculated as the input rotation speed Ri (Ri=$\alpha$×M). The calculation unit 13 may convert the input rotation speed Ri into a traveling speed V1 of the vehicle 1, based on a diameter D of the rear drive wheels 3L and 3R (V1=$\pi$×D×Ri).

The calculation unit 13 further calculates an output rotation speed Ro to be output from the differential gear mechanism 7, based on the wheel speeds WL and WR that have been respectively detected by the wheel speed sensors 31L and 31R. More specifically, an arithmetic mean of the left wheel speed WL that has been detected by the left wheel speed sensor 31L and the right wheel speed WR that has been detected by the right wheel speed sensor 31R is calculated as the output rotation speed Ro (Ro=(WL+WR)/2). The calculation unit 13 may convert the output rotation speed Ro into a traveling speed V2 of the vehicle 1, based on the diameter D of the rear drive wheels 3L and 3R (V2=$\pi$×D×Ro).

The determination unit 14 determines whether a duration T, in a state in which a difference (|Ri−Ro|) between the input rotation speed Ri and the output rotation speed Ro exceeds a predetermined value A, has exceeded a first determination time T1. That is, in a case where the input rotation speed Ri that has been input from the rear motor 5 into the differential gear mechanism 7 does not match the output rotation speed Ro that has been output from the differential gear mechanism 7 to the rear drive wheels 3L and 3R via the shafts 30L and 30R, there is a possibility that a failure such the shaft damage is occurring. In a case where the difference (|Ri−Ro|) between the input rotation speed Ri and the output rotation speed Ro exceeds a sufficiently small predetermined value A (A≈0), which has been defined in consideration of an error or the like, and the duration T in such a state has exceeded the first determination time T1, which is extremely short, it is determined that there is a possibility of the shaft damage.

Figure 3:
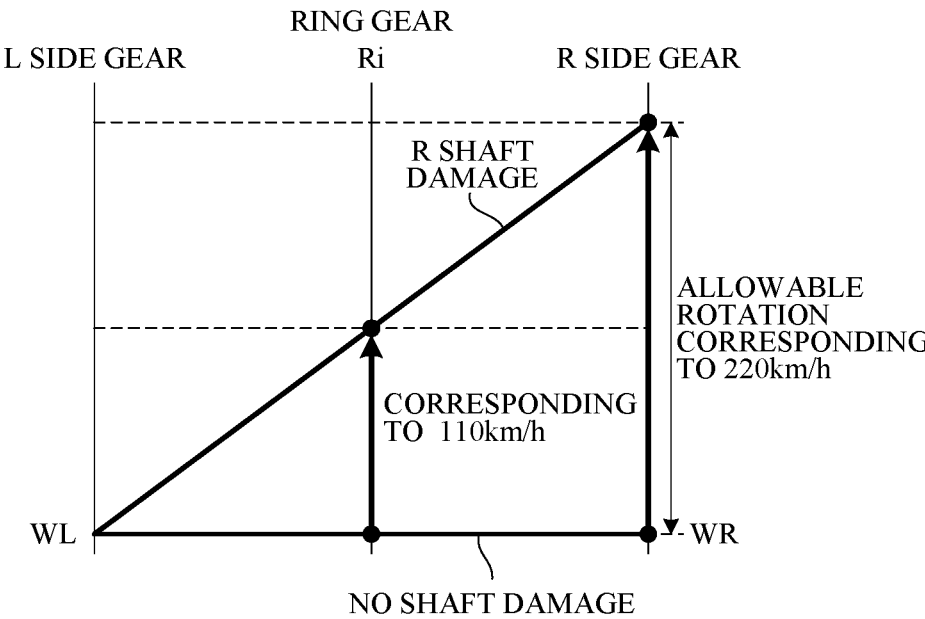
FIG. 3 is an alignment chart for describing torque limi-tation by a limitation unit of FIG. 2.

FIG. 3 is an alignment chart for describing torque limitation by the limitation unit 15, and illustrates the rotation speeds of the ring gear 64 and the left and right side gears 71 and 72 of the differential gear mechanism 7, when the right shaft 30R is damaged. As illustrated in FIG. 3, while no shaft damage occurs, both of the rotation speeds of the left and right side gears 71 and 72 respectively match the left and right wheel speeds WL and WR.

On the other hand, when the shaft damage occurs, the right side gear 72, in which the shaft damage occurs, is decoupled from the rear drive wheel 3R on the right side, and thus rotates idly. Accordingly, the rotation speed (the input rotation speed Ri) of the ring gear 64 rises, and the rear motor 5 is made to rotate idly, leading to motor overspeed. If the difference between the rotation speeds of the left and right side gears 71 and 72 exceeds a predetermined allowable rotation (for example, the rotation speed corresponding to the traveling speed 220 [km/h] of the vehicle 1) that has been defined beforehand by tests or the like, the seizure may occur in the differential gear mechanism 7.

When the determination unit 14 determines that the duration T exceeds the first determination time T1 and there is a possibility of the shaft damage, the limitation unit 15 limits the target torque of the rear motor 5 to zero. By determining that there is a possibility of the shaft damage in the first determination time T1, which is extremely short, based on a difference between the input rotation speed Ri and the output rotation speed Ro of the differential gear mechanism 7, and immediately limiting the target torque of the rear motor 5 to zero, it becomes possible to prevent the seizure of the differential gear mechanism 7 with certainty. That is, the rotation speed of the ring gear 64 can be prevented from reaching the predetermined rotation speed (for example, the rotation speed corresponding to the traveling speed 110 [km/h] of the vehicle 1), and the difference between the rotation speeds of the side gears 71 and 72 can be prevented from reaching the predetermined allowable rotation with certainty.

Vehicle Speed Limitation (FSA)

The determination unit 14 further determines whether the duration T has exceeded a second determination time T2, which is longer than first determination time T1. Note that the second determination time T2 is set to be longer than a determination time for determining, by an on-board diagnostics (OBD) of the vehicle 1, whether the motor rotation speed sensor 53 fails. When the OBD determines that motor rotation speed sensor 53 fails, the driver of the vehicle 1 is notified of an abnormality by a malfunction indication lamp (MIL).

In a case where the determination unit 14 determines that the duration T exceeds the second determination time T2 and there is a high probability of the shaft damage, the limitation unit 15 limits the vehicle speed (travel speed) of the vehicle 1 as an FSA. More specifically, the front motor 4 is controlled via the front motor control unit 11 so as to limit the traveling speed of the vehicle 1 to a predetermined traveling speed (for example, 110 [km/h]) or lower. In addition, by conducting gate-off control of the inverter 52 together with the vehicle speed limitation, the supply of the electric current to the rear motor 5 is completely stopped, so that the rear motor 5 is suppressed from overspeed, and a short circuit or the like caused by a damaged piece of the shaft or the like is avoided.

Figure 4:
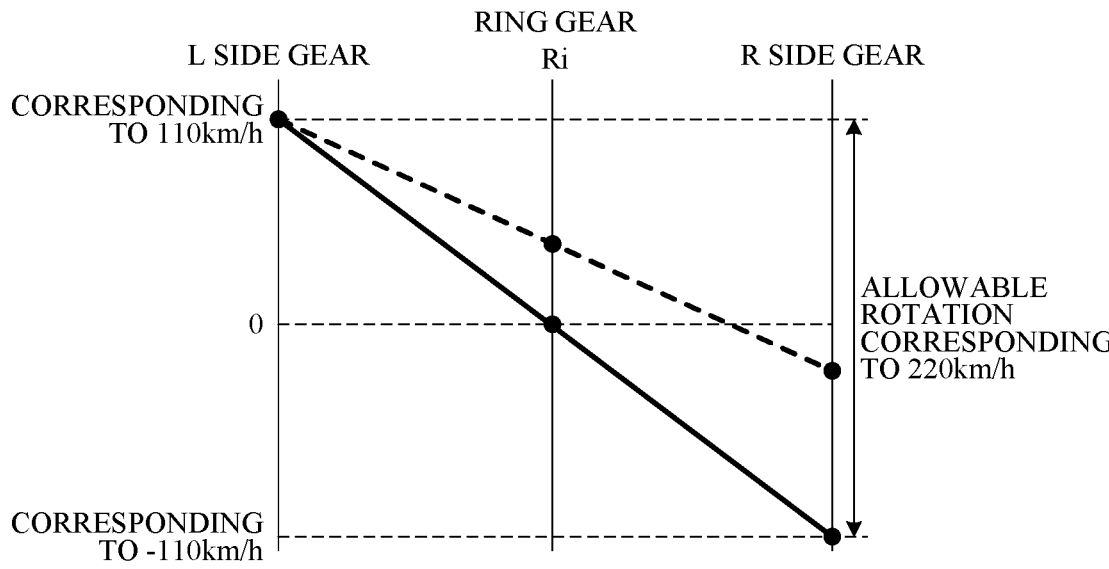
FIG. 4 is an alignment chart for describing vehicle speed limitation by the limitation unit of FIG. 2.

FIG. 4 is an alignment chart similar to FIG. 3 for describing the vehicle speed limitation by the limitation unit 15. Also after the torque transmission from the rear motor 5 to the rear drive wheels 3L and 3R is shut off, the AWD vehicle 1 is capable of continuously traveling with torque transmission from the front motor 4 to the front drive wheels 2L and 2R. That is, also after the rear motor 5 is stopped and the input rotation speed Ri to be input into the ring gear 64 of the differential gear mechanism 7 becomes "0", the vehicle 1 is continuously traveling, and then the rear drive wheels 3L and 3R rotate at a rotation speed corresponding to the traveling speed of the vehicle 1.

In such a case, as indicated by a solid line in FIG. 4, the left side gear 71 rotates via the left shaft 30L, which is not damaged. Thus, the right side gear 72, in which the shaft damage has occurred, rotates idly in an opposite direction. By limiting the traveling speed of the vehicle 1 to a predetermined traveling speed (for example, 110 [km/h]) or lower in accordance with the vehicle speed limitation, the difference between the rotation speeds of the side gears 71 and 72, while the vehicle 1 is continuously traveling, can be suppressed within a predetermined allowable rotation, and the seizure of the differential gear mechanism 7 can be prevented.

Note that as indicated by a broken line in FIG. 4, when the ring gear 64 is rotated together by the rotation of the left rear drive wheel 3L, the right side gear 72 is suppressed from rotating idly. Therefore, even when the ring gear 64 is rotated together, the traveling speed of the vehicle 1 is limited to the predetermined traveling speed or lower in accordance with the vehicle speed limitation, so that the difference in the rotation speeds of the side gears 71 and 72 is suppressed to be within the predetermined allowable rotation.

Countermeasures Against Erroneous Detection

Figure 5:
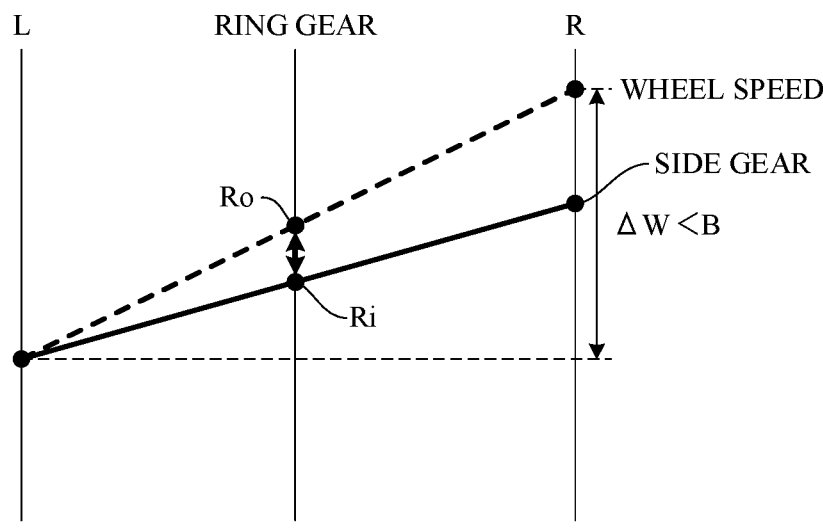
FIG. 5 is an alignment chart illustrating an example of a shaft damage.
Figure 6:
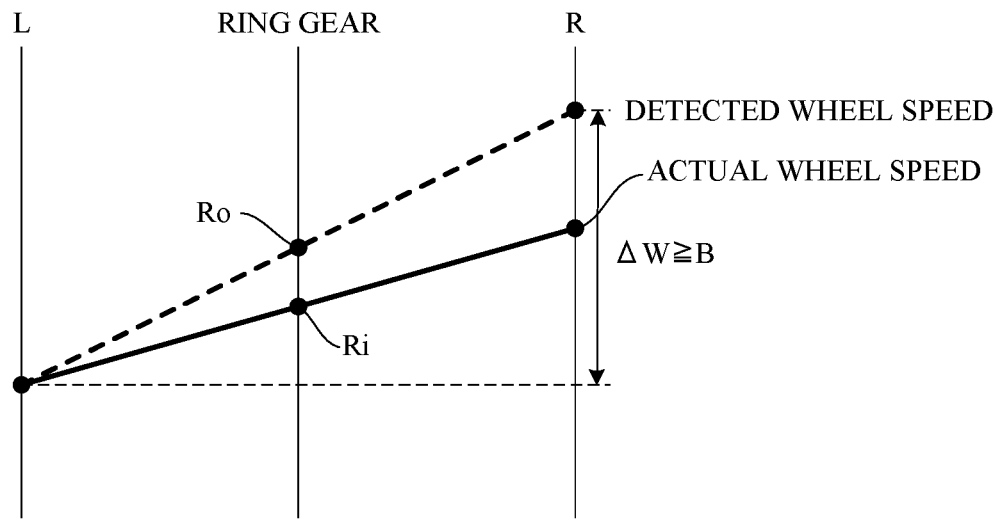
FIG. 6 is an alignment chart illustrating an example of a wheel speed sensor failure.

FIGS. 5 to 9 are alignment charts illustrating the rotation speeds of the ring gear 64 and the left and right rear drive wheels 3L and 3R or the side gears 71 and 72 of the differential gear mechanism 7. As illustrated in FIGS. 5 and 6, in a case where the input rotation speed Ri from the rear motor 5 to the differential gear mechanism 7 does not match the output rotation speed Ro from the differential gear mechanism 7 to the rear drive wheels 3L and 3R, there may be a case where the shaft damage is occurring and a case where a sensor failure is occurring.

As illustrated in FIG. 5, in a case where the right shaft 30R is damaged, the rotation speed of the right side gear 72 and the rotation speed of the rear drive wheel 3R on the right side do not match each other. Hence, the input rotation speed Ri from the rear motor 5 and the output rotation speed Ro to the rear drive wheels 3L and 3R do not match each other. In this case, the rear drive wheels 3L and 3R respectively rotate at the wheel speeds WL and WR corresponding to the traveling speed of the vehicle 1, and a wheel speed difference ΔW between the left and right wheel speeds WL and WR does not become equal to or larger than a predetermined wheel speed difference B, which has been defined beforehand to correspond to when the vehicle 1 travels making a turn. On the other hand, as illustrated in FIG. 6, when the right wheel speed sensor 31R fails, the wheel speed difference ΔW may become equal to or larger than the predetermined wheel speed difference B.

The calculation unit 13 may further calculate the wheel speed difference ΔW, based on the wheel speeds WL and WR that have been respectively detected by the wheel speed sensors 31L and 31R, and the determination unit 14 may further determine whether the wheel speed difference ΔW is smaller than the predetermined wheel speed difference B. In a case where it is determined that the wheel speed difference ΔW is equal to or larger than the predetermined wheel speed difference B, it is considered that a sensor failure, not the shaft damage, is occurring. Therefore, the torque limitation is not conducted. That is, the limitation unit 15 may conduct the torque limitation on condition that the determination unit 14 determines that the wheel speed difference ΔW is smaller than the predetermined wheel speed difference B. In this case, erroneous detection of the shaft damage caused by the failure of the wheel speed sensors 31L and 31R can be avoided.

Figure 7:
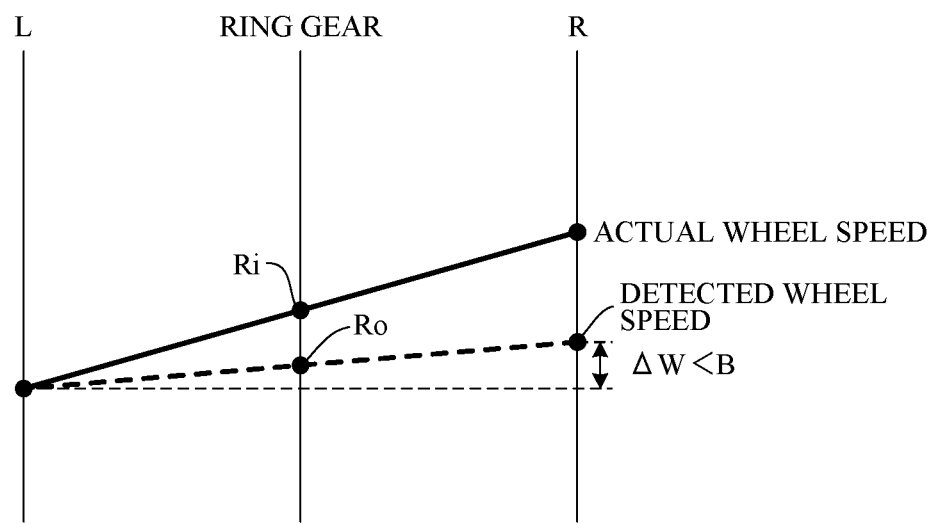
FIG. 7 is an alignment chart illustrating another example of the wheel speed sensor failure.

As illustrated in FIG. 7, even when the right wheel speed sensor 31R fails, the wheel speed difference ΔW is smaller than the predetermined wheel speed difference B, in some cases. In such cases, it is not possible to determine whether the shaft damage is occurring or the sensor failure is occurring. For this reason, it is configured not to determine the possibility of the shaft damage based on the difference between the input rotation speed Ri and the output rotation speed Ro. More specifically, a predetermined value A to be compared with the difference (|Ri−Ro|) between the input rotation speed Ri and the output rotation speed Ro is set to a value equal to or larger than the predetermined wheel speed difference B. In a case where the difference (|Ri−Ro|) is extremely small, it is configured not to determine the possibility of the shaft damage. Accordingly, even in a case where the wheel speed difference ΔW, which is smaller than the predetermined wheel speed difference B, is calculated, the erroneous detection of the shaft damage caused by the failure of the wheel speed sensor 31L or 31R can be avoided.

Figure 8:
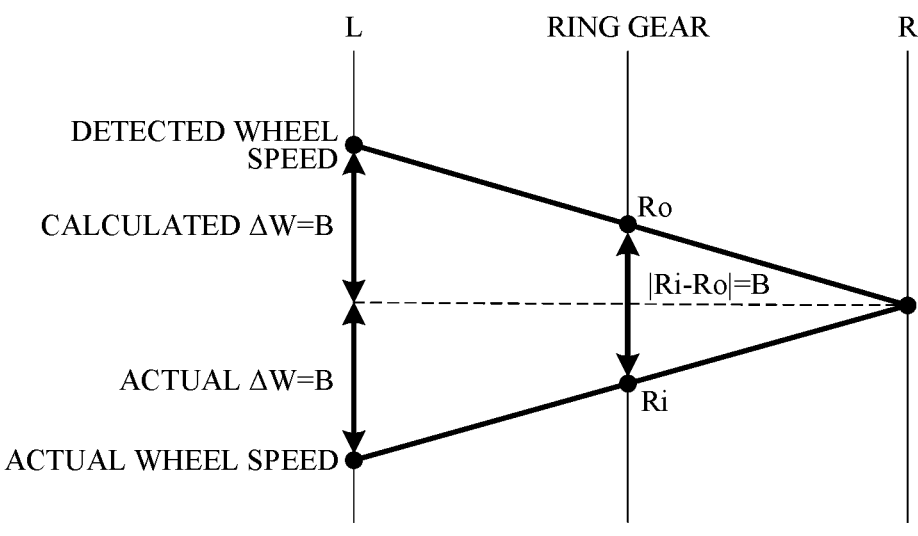
FIG. 8 is an alignment chart illustrating yet another example of the wheel speed sensor failure.

As illustrated in FIG. 8, in a case where both the actual wheel speed difference ΔW and the wheel speed difference ΔW, which has been calculated, based on a detection value of the left wheel speed sensor 31L that has failed, become the predetermined wheel speed difference B, the difference (|Ri−Ro|) between the input rotation speed Ri and the output rotation speed Ro also becomes the predetermined wheel speed difference B. Therefore, also in such a case, the predetermined value A is set to a value equal to or larger than the predetermined wheel speed difference B, so that the erroneous detection of the shaft damage caused by the failure of the wheel speed sensors 31L or 31R can be avoided.

Figure 9:
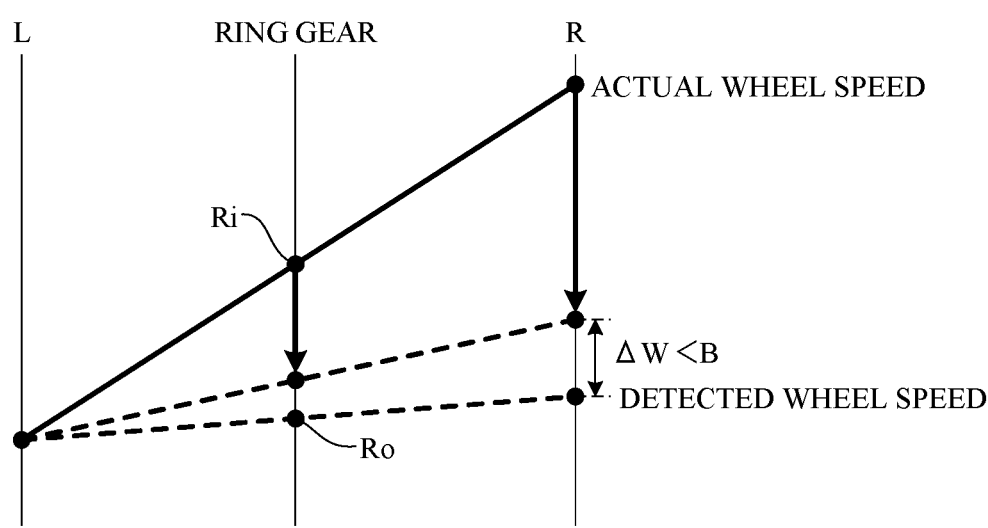
FIG. 9 is an alignment chart illustrating an example of a drive wheel slip on one side during the wheel speed sensor failure.

As illustrated in FIG. 9, when only the rear drive wheel 3R on the right side slips (rotates idly), the wheel speed difference ΔW becomes smaller than the predetermined wheel speed difference B caused by the failure of the wheel speed sensor 31R, in some cases. In such cases, the difference (|Ri−Ro|) between the input rotation speed Ri and the output rotation speed Ro is larger than the predetermined value A and the wheel speed difference ΔW is smaller than the predetermined wheel speed difference B. Therefore, it is determined that there is a possibility of the shaft damage, and the torque limitation is conducted. When the torque limitation is conducted, the input rotation speed Ri and the actual wheel speed WR decrease, and idle rotation of the rear drive wheel 3R is eliminated. Therefore, the difference (|Ri−Ro|) between the input rotation speed Ri and the output rotation speed Ro decreases to a predetermined value A or smaller. In this case, the duration T, in a state in which the difference (|Ri−Ro|) exceeds the predetermined value A, does not exceed the second determination time T2. Therefore, the determination of a high probability of the shaft damage and the vehicle speed limitation can be avoided.

Figure 10:
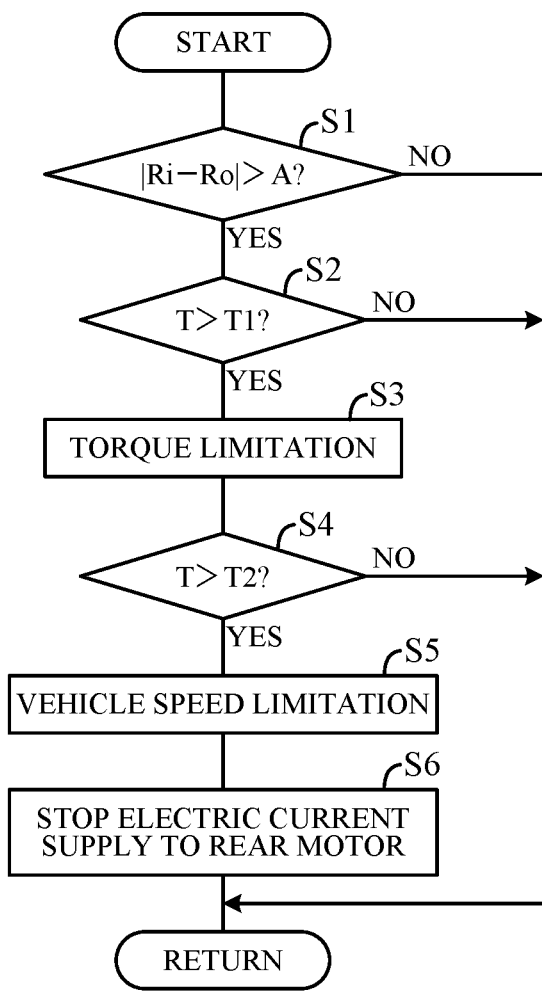
FIG. 10 is a flow chart illustrating an example of pro-cessing performed by the vehicle control apparatus accord-ing to the embodiment of the present invention.
Figure 11:
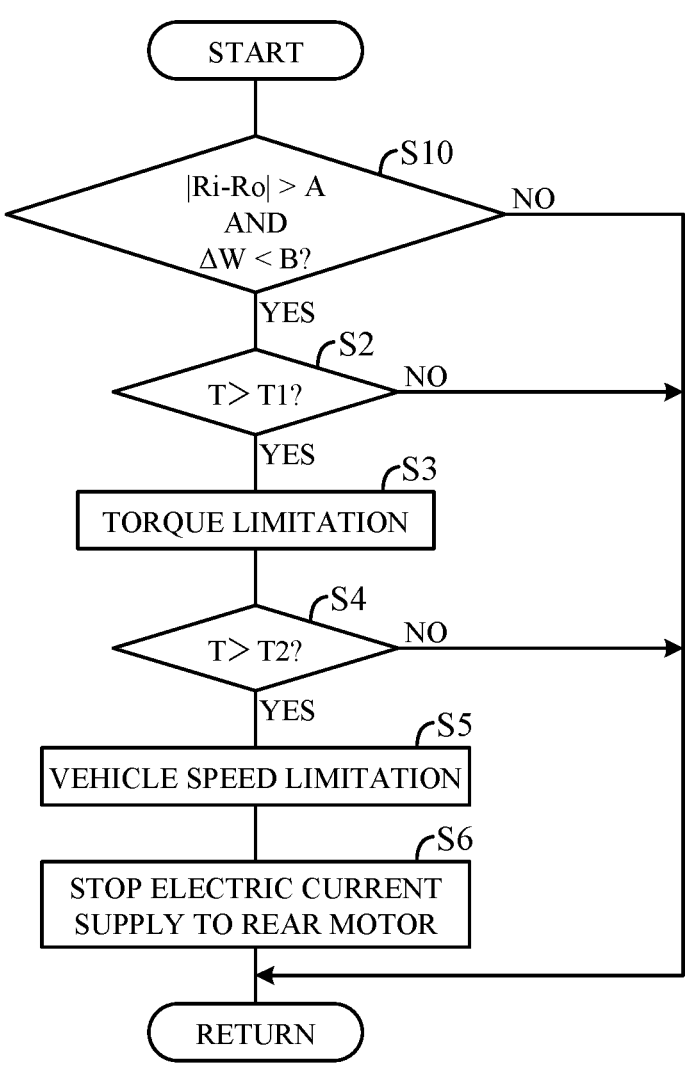
FIG. 11 is a flow chart illustrating another example of processing performed by the vehicle control apparatus according to the embodiment of the present invention.

FIG. 10 and FIG. 11 are flow charts illustrating an example of processing performed by the motor control unit 10 of the apparatus 100. The processing illustrated in these flowcharts starts, for example, when the vehicle 1 starts up and the motor control unit 10 is activated, and is repeatedly performed at a predetermined cycle.

As illustrated in FIG. 10, first, in S1 (S: processing step), the input rotation speed Ri and the output rotation speed Ro are calculated based on values detected by the motor rotation speed sensor 53 and the wheel speed sensors 31L and 31R, and it is determined whether the difference (|Ri−Ro|) is larger than the predetermined value A. When the determination is positive in S1, the process proceeds to S2, and when the determination is negative in S1, the process ends. In S2, it is determined whether the duration T of a state in which the difference (|Ri−Ro|) exceeds the predetermined value A has exceeded the first determination time T1. When the determination is positive in S2, the process proceeds to S3 where the torque limitation is conducted, while when the determination is negative in S2, the process ends. Next, in S4, it is determined whether the duration T of a state in which the difference (|Ri−Ro|) exceeds the predetermined value A has exceeded the second determination time T2. When the determination is positive in S4, the process proceeds to S5 and S6 where the torque limitation is conducted and the supply of the electric current to the rear motor 5 is stopped, while when the determination is negative in S4, the process ends.

Thus, it becomes possible to surely prevent the seizure of the differential gear mechanism 7, by determining that there is a possibility of the shaft damage based on the difference between the input rotation speed Ri and the output rotation speed Ro of the differential gear mechanism 7 in the extremely short first determination time T1 and immediately conducting the torque limitation (S1 to S3). Further, it becomes possible to prevent seizure of the differential gear mechanism 7 while continuing travel of the vehicle 1 with the FSA, by conducting the vehicle speed limitation when it is determined that there is a high probability of the shaft damage in the second determination time T2 (S4 to S5). Further, it becomes possible to suppress overspeed of the rear motor 5 and to prevent short circuit or the like caused by pieces of the damaged shaft or the like, by completely stopping the supply of the electric current to the rear motor 5 together with the vehicle speed limitation (S6).

As illustrated in FIG. 11, in S10, the input rotation speed Ri, the output rotation speed Ro, and the wheel speed difference ΔW are calculated based on values detected by the motor rotation speed sensor 53 and the wheel speed sensors 31L and 31R, and then, it is determined whether the difference (|Ri−Ro|) exceeds the predetermined value A and the wheel speed difference ΔW is smaller than the predetermined wheel speed difference B. In this case, erroneous detection of the shaft damage caused by sensor failure can be avoided (S10).

According to the present embodiment, the following operations and effects are achievable.

(1) The apparatus 100 includes: the shafts 30L and 30R respectively coupled with the pair of left and right rear drive wheels 3L and 3R of the vehicle 1; the differential gear mechanism 7, which distributes torque from the rear motor 5 to the shafts 30L and 30R; the wheel speed sensors 31L and 31R, which detect the wheel speeds WL and WR that are rotation speeds of the rear drive wheels 3L and 3R; the motor rotation speed sensor 53, which detects the rotation speed M of the rear motor 5; and the motor control unit 10, which controls the rear motor 5 (FIGS. 1 and 2). The motor control unit 10 includes: the calculation unit 13, which calculates the input rotation speed Ri to be input into the differential gear mechanism 7, based on the rotation speed M of the rear motor 5, and which also calculates the output rotation speed Ro to be output from the differential gear mechanism 7, based on the wheel speeds WL and WR; the determination unit 14, which determines whether the duration T, in a state in which the difference (|Ri−Ro|) between the input rotation speed Ri and the output rotation speed Ro exceeds the predetermined value A, has exceeded the first determination time T1; and the limitation unit 15, which limits the target torque of the rear motor 5 to zero, in a case where the determination unit 14 determines that the duration T has exceeded the first determination time T1 (S1 to S3 in FIGS. 2 and 10). In this manner, it is determined that there is a possibility of the shaft damage, based on the difference (|Ri−Ro|) between the input rotation speed Ri and the output rotation speed Ro of the differential gear mechanism 7, and the torque limitation is immediately conducted, so that the seizure of the differential gear mechanism 7 can be prevented with certainty.

(2) The vehicle 1 includes: the rear motor 5, which drives the pair of left and right rear drive wheels 3L and 3R on the rear side; and the front motor 4, which drives the pair of left and right front drive wheels 2L and 2R on the front side (FIG. 1). The determination unit 14 further determines whether the duration T has exceeded the second determination time T2, which is longer than first determination time T1 (S4 in FIG. 10). In a case where the determination unit 14 further determines that the duration T has exceeded the second determination time T2, the limitation unit 15 controls the front motor 4 to limit the traveling speed of the vehicle 1 (S5 in FIG. 10).

In this manner, when it is determined that there is a high probability of the shaft damage by use of the second determination time T2, the vehicle speed limitation is conducted, so that the seizure of the differential gear mechanism 7 can be prevented, while the vehicle 1 is continuously traveling in accordance with the FSA. In addition, the probability of the shaft damage is determined in a stepwise manner, and the torque limitation or the vehicle speed limitation as the FSA can be conducted at an appropriate timing.

(3) In a case where the determination unit 14 further determines that the duration T has exceeded the second determination time T2, the limitation unit 15 stops the supply of the electric current to the rear motor 5 (S6 in FIG. 10). In this manner, together with the vehicle speed limitation, the supply of the electric current to the rear motor 5 is completely stopped, so that the rear motor 5 can be suppressed from overspeed and a short circuit or the like caused by a damaged piece of the shaft or the like can be avoided.

(4) The calculation unit 13 further calculates the wheel speed difference ΔW between the wheel speeds WL and WR, and the determination unit 14 further determines whether the wheel speed difference ΔW is smaller than the predetermined wheel speed difference B (S10 in FIG. 11). The limitation unit 15 limits the target torque to zero on condition that the determination unit 14 determines that the wheel speed difference ΔW is smaller than the predetermined wheel speed difference B (S10 and S2 to S3 in FIG. 11). In this case, the erroneous detection of the shaft damage caused by a sensor failure can be avoided.

The above embodiment can be combined as desired with one or more of the aforesaid modifications. The modifications can also be combined with one another.

According to the present invention, it becomes possible to satisfactorily determine whether the shaft connected with the differential gear mechanism is damaged or the like.

Above, while the present invention has been described with reference to the preferred embodiments thereof, it will be understood, by those skilled in the art, that various changes and modifications may be made thereto without departing from the scope of the appended claims.

The invention claimed is:

1. A vehicle control apparatus, comprising:
   a first shaft coupled with a first drive wheel of a pair of left and right drive wheels of a vehicle;
   a second shaft coupled with a second drive wheel of the pair of left and right drive wheels;
   a differential gear mechanism configured to distribute torque from a motor to the first shaft and the second shaft;
   a first wheel speed sensor configured to detect a first wheel rotation speed of the first drive wheel;
   a second wheel speed sensor configured to detect a second wheel rotation speed of the second drive wheel;
   a motor rotation speed sensor configured to detect a rotation speed of the motor; and
   a motor control unit including a processor and a memory coupled to the processor, and configured to control the motor, wherein
   the motor control unit:
      calculates an input rotation speed input into the differential gear mechanism based on the rotation speed of the motor;
      calculates an output rotation speed output from the differential gear mechanism based on the first wheel rotation speed and the second wheel rotation speed;
      calculates a difference between the input rotation speed and the output rotation speed;
      determines whether a duration of a state in which the difference exceeds a predetermined value has exceeded a determination time; and
      limits a target torque of the motor to zero when it is determined that the duration has exceeded the determination time, wherein
   the pair of left and right drive wheels is one of a front pair of left and right drive wheels and a rear pair of left and right drive wheels, wherein
   the vehicle includes:
      a first motor being the motor and configured to drive the one pair of left and right drive wheels; and
      a second motor configured to drive an other of the front pair of left and right drive wheels and the rear pair of left and right drive wheels, wherein
   the determination time is a first determination time, wherein
   the motor control unit:
      further determines whether the duration has exceeded a second determination time longer than the first determination time; and controls the second motor to limit a travel speed of the vehicle when it is determined that the duration has exceeded the second determination time.

2. The vehicle control apparatus according to claim 1, wherein the motor control unit stops supply of electric current to the first motor when it is determined that the duration has exceeded the second determination time.

3. The vehicle control apparatus according to claim 1, wherein the second determination time is set to be longer than a determination time for determining whether the motor rotation speed sensor fails by an on-board diagnostics of the vehicle.

4. A vehicle control apparatus, comprising:

a first shaft coupled with a first drive wheel of a pair of left and right drive wheels of a vehicle;

a second shaft coupled with a second drive wheel of the pair of left and right drive wheels;

a differential gear mechanism configured to distribute torque from a motor to the first shaft and the second shaft;

a first wheel speed sensor configured to detect a first wheel rotation speed of the first drive wheel;

a second wheel speed sensor configured to detect a second wheel rotation speed of the second drive wheel;

a motor rotation speed sensor configured to detect a rotation speed of the motor; and a motor control unit including a processor and a memory coupled to the processor, and configured to control the motor, wherein the motor control unit:

calculates an input rotation speed input into the differential gear mechanism based on the rotation speed of the motor;

calculates an output rotation speed output from the differential gear mechanism based on the first wheel rotation speed and the second wheel rotation speed;

calculates a difference between the input rotation speed and the output rotation speed;

determines whether a duration of a state in which the difference exceeds a predetermined value has exceeded a determination time; and limits a target torque of the motor to zero when it is determined that the duration has exceeded the determination time, wherein the motor control unit:

further calculates a wheel speed difference between the first wheel rotation speed and the second wheel rotation speed;

determines whether the wheel speed difference is smaller than a predetermined wheel speed difference; and limits the target torque to zero on condition that it is determined that the wheel speed difference is smaller than the predetermined wheel speed difference.

5. The vehicle control apparatus according to claim 4, wherein the predetermined value is set to a value equal to or larger than the predetermined wheel speed difference.

6. A vehicle control apparatus, comprising:

a first shaft coupled with a first drive wheel of a pair of left and right drive wheels of a vehicle;

a second shaft coupled with a second drive wheel of the pair of left and right drive wheels;

a differential gear mechanism configured to distribute torque from a motor to the first shaft and the second shaft;

a first wheel speed sensor configured to detect a first wheel rotation speed of the first drive wheel;

a second wheel speed sensor configured to detect a second wheel rotation speed of the second drive wheel;

a motor rotation speed sensor configured to detect a rotation speed of the motor; and a motor control unit including a processor and a memory coupled to the processor, and configured to control the motor, wherein the motor control unit:

calculates an input rotation speed input into the differential gear mechanism based on the rotation speed of the motor;

calculates an output rotation speed output from the differential gear mechanism based on the first wheel rotation speed and the second wheel rotation speed;

calculates a difference between the input rotation speed and the output rotation speed;

determines whether a duration of a state in which the difference exceeds a predetermined value has exceeded a determination time; and limits a target torque of the motor to zero when it is determined that the duration has exceeded the determination time, wherein the motor control unit calculates an arithmetic mean of the first wheel rotation speed detected by the first wheel speed sensor and the second wheel rotation speed detected by the second wheel speed sensor as the output rotation speed.

* * * * *